Dec. 31, 1968 W. PABST 3,419,727

DEVICE FOR DIGITAL MEASUREMENT OF ANGULAR MOTION

Filed March 9, 1965

Inventor:
Wolfgang Pabst
By: Spencer & Kaye
Attorneys

United States Patent Office 3,419,727
Patented Dec. 31, 1968

3,419,727
DEVICE FOR DIGITAL MEASUREMENT OF ANGULAR MOTION

Wolfgang Pabst, Neu Isenburg, Germany, assignor to Licentia Patent-Verwaltungs-G.m.b.H., Frankfurt am Main, Germany Filed Mar. 9, 1965, Ser. No. 438,184
Claims priority, application Germany, Mar. 9, 1964, L 36,692, L 47,239
7 Claims. (Cl. 250—231)

ABSTRACT OF THE DISCLOSURE

A device for measuring angular motion and rendering the measurement in digital form. The device includes a first code disc having a first band provided with a code pattern and a second transparent band provided either with transparent material or no material at all, and a second code disc having a band provided with a code pattern in substantial alignment with the second transparent band of the first code disc. The device further includes a reduction gearing arrangement linking the first and second code discs and a light source arranged to direct light through the first and second bands of the first disc and the band of the second disc.

The present invention relates to a digital measuring device, and more particularly to a digital device utilizing code discs for measuring rotary motion, or longitudinal motion converted into rotary motion by means of rack and pinion type gearing. This type of device, sometimes called an angle coding device, provides a very accurate measure of displacement since each point of the path of travel to be measured is represented as a coded number. The code patterns, which may form a binary code, are provided on code discs. Each number place may be represented by a track, or band, on the disc.[1]

If an angle coding device utilizes only a single code disc, it is only capable of reading out angles up to 360°. It is, however, often necessary to measure larger angles. In such cases, reduction gearing may be used to increase the measuring range. However, measurement error may then be introduced by the gearing. For this reason, several code discs driven through reduction gearing are sometimes used to measure over ranges greater than 360°,[2, 3, 4] in which case the measurement is performed by the zone reversing method, sometimes called V-scanning or double scanning.[2, 3, 4] In devices of this kind, tolerances which increase from disc to disc are acceptable, so that within certain limits, gear faults may be considered harmless.

With this prior art in mind, it is an object of the present invention to provide an angle coding device in which a plurality of code discs are used and photoelectric scanning is used wherein the scanning devices are relatively close to each other and such scanning devices and their associated electronic elements may be disposed in a single common chamber or space.

Another object is to provide an arrangement of the character described wherein an illuminating device can be disposed near the scanning devices and all of these devices are easily accessible from outside the device.

[1] Atkinson, "Digital Codes in Data-Processing Systems," Trans. of the Society of Instrument Technology (December 1957), pp. 124–130.
[2] Pabst, "Digitale Lagemessung an Arbeitsmaschine," Archiv. für Technisches Messen und Industrielle Messtechnik (September 1963), Lieferung 332, pp. R113–R119.
[3] Steinbuch, Taschenbuch der Nachrichtenübertragung, Springerverlag, Berlin (1962), pp. 758–765.
[4] U.S. Patent No. 2,866,184.

A further object is to provide an angle coding device in which a single illuminating element can be used for three or more code discs.

Still another object is to provide such a device in which the diameter thereof is primarily determined by the diameter of the code discs and is not increased by the illuminating element.

These objects as well as others are accomplished according to the present invention, wherein a digital rotary measuring device is provided having at least two code discs, one of which is driven by the other through reduction gearing, and one of which discs is partly transparent, allowing light from a light source to shine through the transparent portion onto a further disc. Illumination for the digital output can be provided by a light source located in the space required for the gear reduction unit.

Additional objects and advantages of the present invention will become apparent upon consideration of the following description when taken in conjunction with the accompanying drawings in which.

Figures 1, 2, 3:
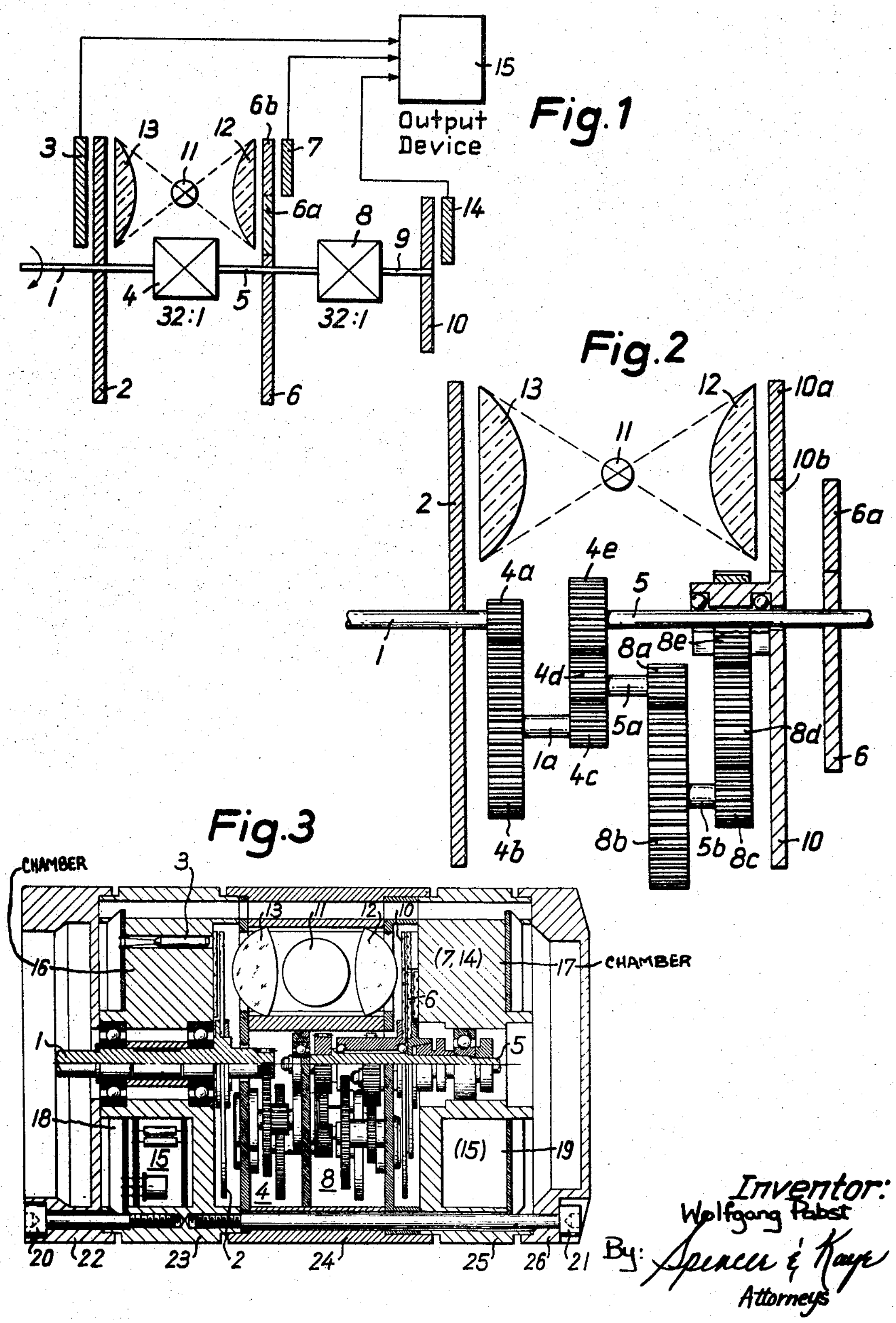
FIGURE 1 is a schematic view of a device designed according to the invention.
FIGURE 2 is a partial cross-sectional view showing the construction, and especially the gearing, of an embodiment of the invention.
FIGURE 3 is a sectional view showing the structural details of an actual embodiment of a device according to the present invention.

Referring to the figures, a shaft 1 is provided which may be coupled to that element the rotations of which are to be measured by conventional means. A code disc 2, upon which a binary code pattern may be provided in any desired scale, is mounted on the shaft 1. The code disc 2 may be connected through a gear reduction unit 4 to a second code disc 6. The unit 4 may have a reduction ratio of 32:1, so that its output shaft 5 revolves once for every 32 revolutions of the code disc 2. In this case, the disc 6 would be divided into 32 code sectors.

The disc 6 has a transparent portion 6*a* and further portion 6*b* upon which a code pattern is provided. The code disc 6 may be connected with a further code disc 10 by means of another gear reduction unit 8, which may also have a 32:1 reduction ratio. In this case, the code disc 10 would also be provided with 32 code sectors. A light source 11 is provided at the focus of two condenser lenses 12, 13, which thus directs substantially parallel rays of light through code discs 2 and 6. The light from condenser 13 passes through code disc 2 and registers the code pattern thereon on a photoelectric sensing unit 3. The light from condenser 12 passes through the coded portion 6*b* of disc 6, registering on photoelectric sensor 7, and through the transparent portion 6*a* of disc 6 and the further code wheel 10, so that it registers on sensing element 14. Thus a single light source located centrally between discs 2 and 6 may be used to illuminate all three of the code discs.

Alternatively, disc 6 may be of a smaller diameter than that shown, such as that of disc 10, and the diameter of the disc shown as 10 in FIGURE 1 may be larger, for instance the size of disc 6. In this way, the external band or zone of disc 10 receives light directly from the condenser 12.

An embodiment of the invention in which only two discs are utilized may be obtained by leaving out disc 2, as well as the reduction gear unit 4, sensor 3 and condenser 13 in FIGURE 1. This embodiment offers the advantage that the lamp 11, which must be replaced from time to time, as well as the sensing devices 7 and 14, are easily accessible from outside of the device. Furthermore, the electronic sensing elements may then be located in a common space.

FIGURE 1 is merely a schematic representation, especially of the gear units 4 and 8. As a practical matter, the device should be made in such a manner that the code discs 6 and 10 are disposed closed to one another, to facilitate lighting. In FIGURE 2, a practical embodiment of the device is shown in which the various elements are designated by numbers corresponding to those used in FIGURE 1. In the embodiment of FIGURE 2, a special arrangement of the gear reduction units results in an exchange of positions of the code discs 6 and 10. Moreover, if the FIGURE 2 embodiment were considered as being drawn to scale, the reduction ratio between code discs would be only 8:1. Further gearing having a ratio of 4:1 would have to be added to each reduction unit in order to provide the desired 32:1 overall ratio. As shown in FIGURE 2, shaft 1, on which code disc 2 is mounted, drives shaft 5 via gears 4*a*, 4*b*, shaft 1*a*, and gears 4*c*, 4*d* and 4*e*. Thus shaft 1*a* revolves at a speed one quarter that of shaft 1. Shafts 5 and 5*a* rotate in opposite directions and at a speed one half that of the shaft 1*a*. They therefore rotate at a speed one eighth that of shaft 1. Shaft 5*a* drives shaft 5*b* via gear wheels 8*a* and 8*b*, so that shaft 5*b* rotates at a speed one fourth that of shaft 5*a*. Shaft 5*b* drives the code disc 10 via gears 8*c*, 8*d* and 8*e*, on which disc 10 is ball-bearing mounted, resulting in a further reduction of 2:1. The band 10*a* provided on code disc 10 outwardly of band 10*b* has on it a code pattern. Band 6*a* of disc 6 also has a code pattern. To measure an even greater angle of rotation, a fourth code disc may be provided adjacent the code disc 2. In this case, the further code disc would be ball-bearing mounted on shaft 1 to the right of code disc 2.

While a binary code has been referred to in the specification, other codes such as binary decimal codes may also be used; the gear reduction ratios must then be changed accordingly.

It will thus be seen that the present invention has the advantage over the prior art that the photoelectric scanning devices for the two code discs are relatively close to each other, so that the electronic elements for sensing their outputs may both be located in a single column space. Both this space and the opposite one, in which lamp 11 is located, are then easily accessible from outside the device.

It should be noted that the term "transparent" portion of a code disc has been used throughout the specification to refer both to a disc made partially of transparent material, as well as a disc having a smaller diameter than another cooperating disc, so that the "transparent" portion of the latter represents the difference in radius between the two discs. Thus an angle coding device according to the invention can be constructed so that the so-called transparent code disc, that is, the one next to the light source, has a smaller diameter than the outer disc, in which case a code pattern is provided on the whole surface of the "transparent" disc whereas a code pattern is provided only on the protruding portion of the outer disc.

An angle coding device using only two code discs is limited, for practical purposes, in the angle which it may be used to measure. The measurable angular range may be increased at not too great an expense by providing both discs with more finely divided code scales, for instance, having 1024 divisions, and by using a very high reducing gear between them, in this case, in the ratio of 1024:1. However, the allowable gear play is theoretically limited to one quarter of the width of a scale division, based on the allowable tolerance in the location of the scanning device relative to the low-speed code disc. This limits the resolution of the low-speed disc, and thus the maximum reduction gearing allowable. This limit can be increased by providing higher precision gearing, but this becomes uneconomical after a certain point. Therefore, in order to have sufficient resolution and a large measuring range, it is best to increase the number of code discs, for instance from two to three. In this manner, sufficiently high resolution is obtained for a large angular range, yet an unduly high gear reduction ratio is not necessary.

To assure ready access to the light source 11, even when the number of discs must be increased, further discs, provided with corresponding drive mechanisms, may be added to the right of disc 6 in FIGURE 2. Each further disc would have to communicate with the light source 11 through a series of transparent portions of the inner discs. Thus, in order to provide an angle coding device in which all discs are lighted from the same side, the diameter of the discs must increase as their number increases.

In the light of the above-mentioned facts, a three-disc coding device may be provided according to an additional object of the invention, in which a third disc is provided on the opposite side of the light source from the discs of the two-disc device. This allows an increase in the measuring range with no increase in the diameter of the code discs. The third disc may be provided on the shaft which is directly coupled to the element whose motion is to be measured. In practice, it is exceedingly important that an angle coding device has as small a diameter as possible; therefore, this embodiment of the invention is especially useful. The solution provided by the present invention to the central illumination problem in a three-disc coding device is advantageous compared to devices which require a mirror or similar element, since according to the invention the diameter of the device is primarily determined by the diameter of the code discs, and is not increased by the central light source.

The outputs of all the photoelectric scanning devices may be fed to an output device 15, at which the angle measured may be displayed.

FIGURE 3 is a sectional view showing the structural details of a digital device according to the present invention, with the parts corresponding to those of FIGURES 1 and 2 bearing the same reference numerals. FIGURE 3 illustrates the advantageous way in which the sensing devices 3, 7 and 14 and the electronic circuitry 15 therefor are accommodated. The chamber 16 is provided for receiving the circuitry 15 of which the photo diode 3 is shown. The sensing devices 7, 14 are shown as being accommodated within chamber 17. The means 15, which will, in practice, be suitably provided on a printed circuit, are arranged in chambers 18, 19. The angular position coder of FIGURE 3 comprises components 22, 23, 24, 25, 26, with parts 22 and 26 being the two closure pieces. Parts 23 and 25 contain the photoelectric sensing elements 37, 14 and the electronic circuit means 15, while the lighting means and the two drives 4, 8, are arranged in part 24. Here it should be stated that, in contradistinction to the arrangement shown in FIGURE 2 in which the reduction ratio is 8:1, the reduction ratio in the embodiment of FIGURE 3 is 32:1. The individual parts 22 through 26 are connected to each other by means of screws, 20, 21.

It will be understood that the above description of the present invention is susceptible to various modifications, changes, and adaptations, and the same are intended to be comprehended within the meaning and range of equivalents of the appended claims.

What is claimed is:

1. A digital device for measuring angular motion, said device comprising, in combination: means forming a first code disc having a first band provided with a code pattern and a second transparent band; means forming a second code disc having a code pattern thereon in substantial alignment with the transparent portion of said first code disc; reduction gearing means linking said first and second code disc means; and a light source for directing light through the coded portion of the first disc and through the coded portion of the second disc via the transparent portion of the first disc.

2. A device as defined in claim 1, including photoelectric scanning means provided adjacent the coded portion of each code disc means opposite said light source.

3. A device as defined in claim 2, including means forming a third code disc on the opposite side of the light source from said first and second code disc means.

4. A device as defined in claim 3, wherein said third code disc means is provided with means for directly communicating to it the motion of an element, the angular displacement of which is to be measured; said device further including reduction gear means connecting said third disc with said first disc.

5. A device as defined in claim 1, provided with at least one further code disc means, all of said further code disc means being located further from said light source than said second code disc means.

6. A digital device for measuring angular rotation, said device comprising in combination, means forming a first code disc provided with a code pattern, means forming a second code disc having a diameter greater than that of the first coded disc, said second code disc being provided with a code pattern over an area corresponding to the difference in diameter between the first and second code disc means; reduction gearing means linking said first and second code disc means; and a light source for directing light through the coded portions of said first and second code discs.

7. A device as defined in claim 6, provided with at least one further measuring disc means, all of said further measuring disc means being located further from said light source than said second measuring disc means.

References Cited

UNITED STATES PATENTS

| | | | |
|---|---|---|---|
| 3,040,215 | 6/1962 | Farmer et al. | 250—233 X |
| 3,098,152 | 7/1963 | Von Mathes. | |
| 3,238,375 | 3/1966 | Johnson. | |

OTHER REFERENCES

Huskey et al.: Computer Handbook, pp. 18–40, McGraw-Hill, 1962.

RALPH G. NILSON, *Primary Examiner.*

T. N. GRIGSBY, *Assistant Examiner.*

U.S. Cl. X.R.

250—220, 233; 340—347